3,076,336
FLOW METER FOR CHECKING THE EFFICIENCY OF HYDRAULIC INSTALLATIONS

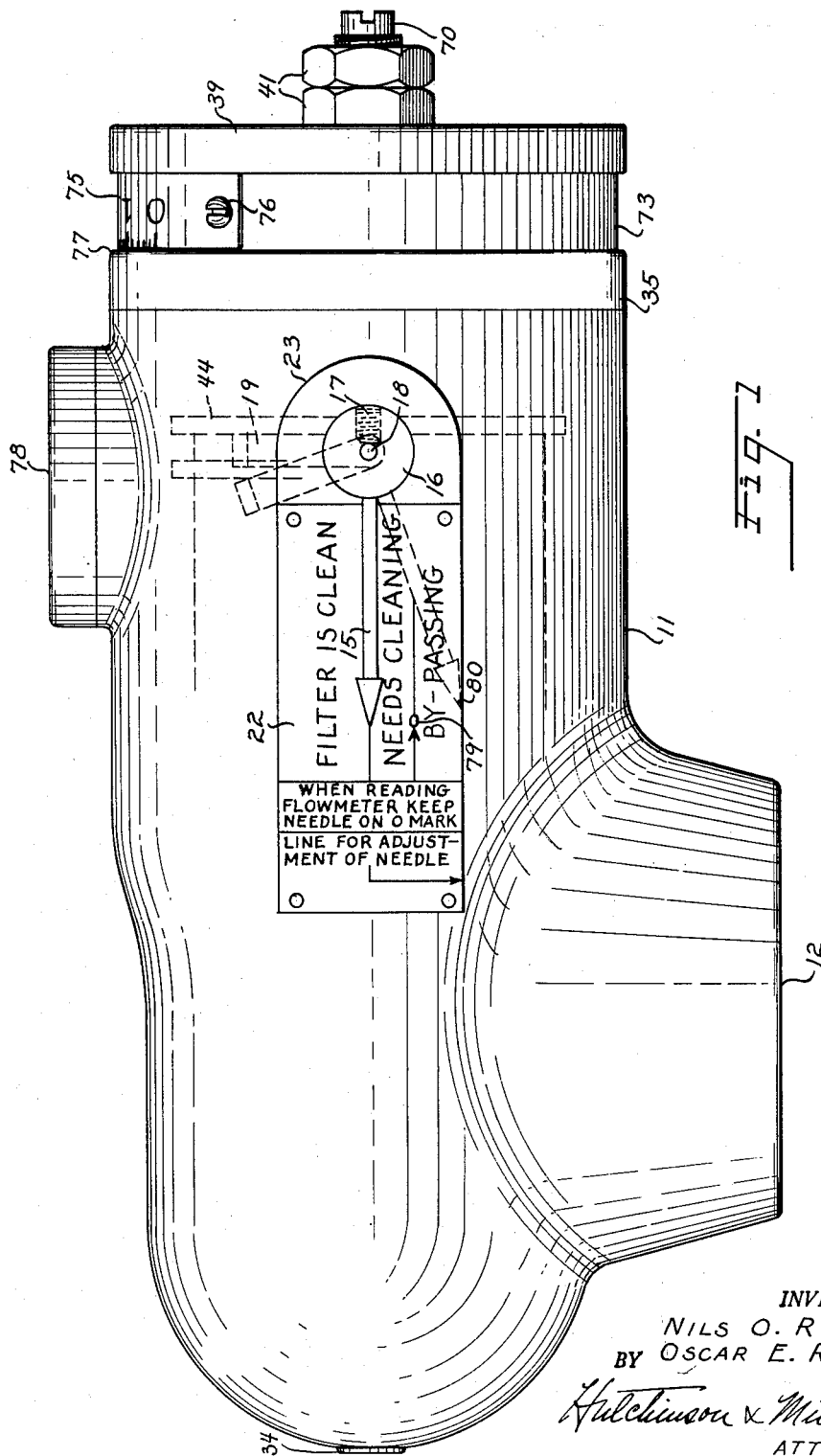

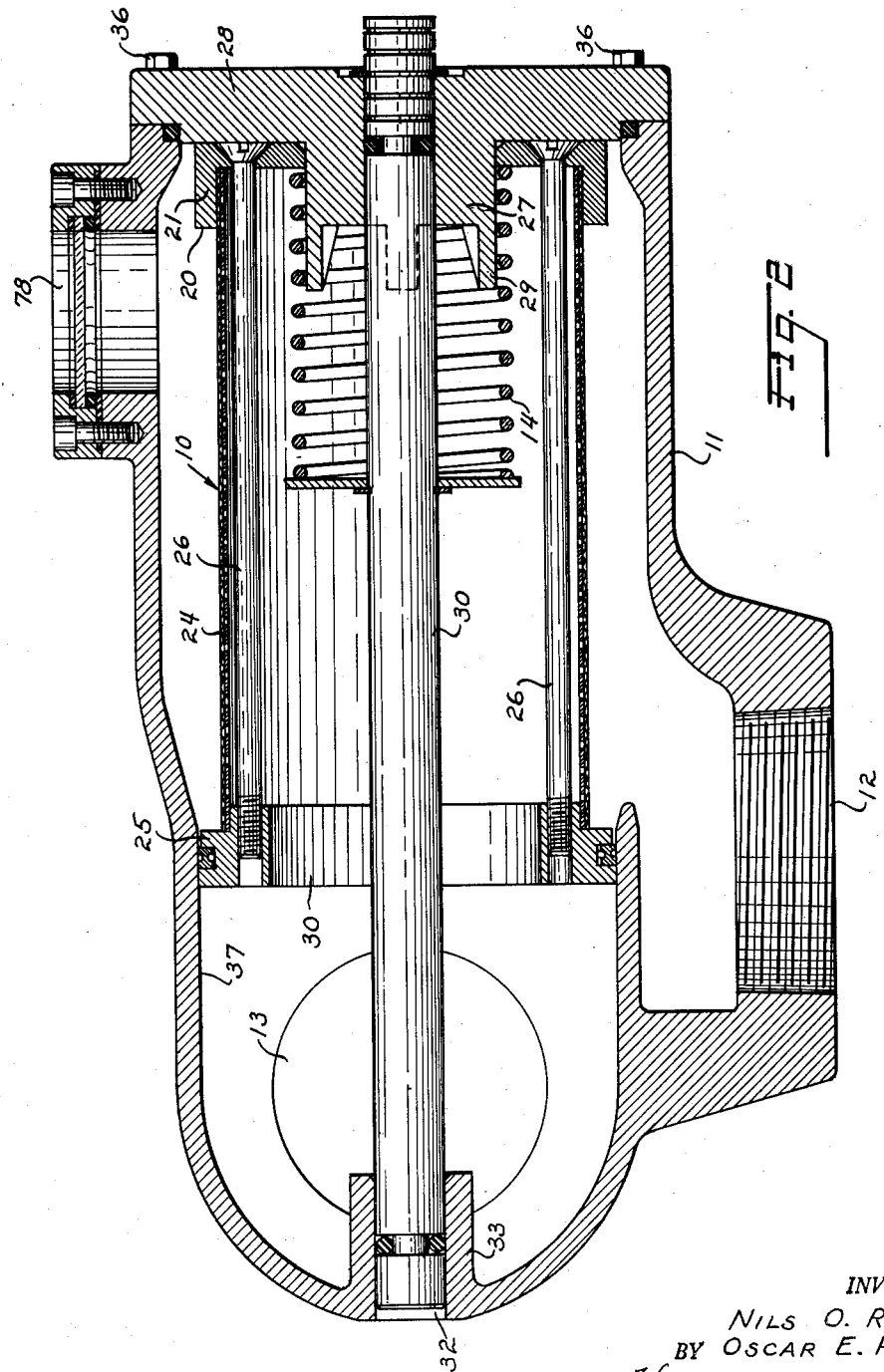

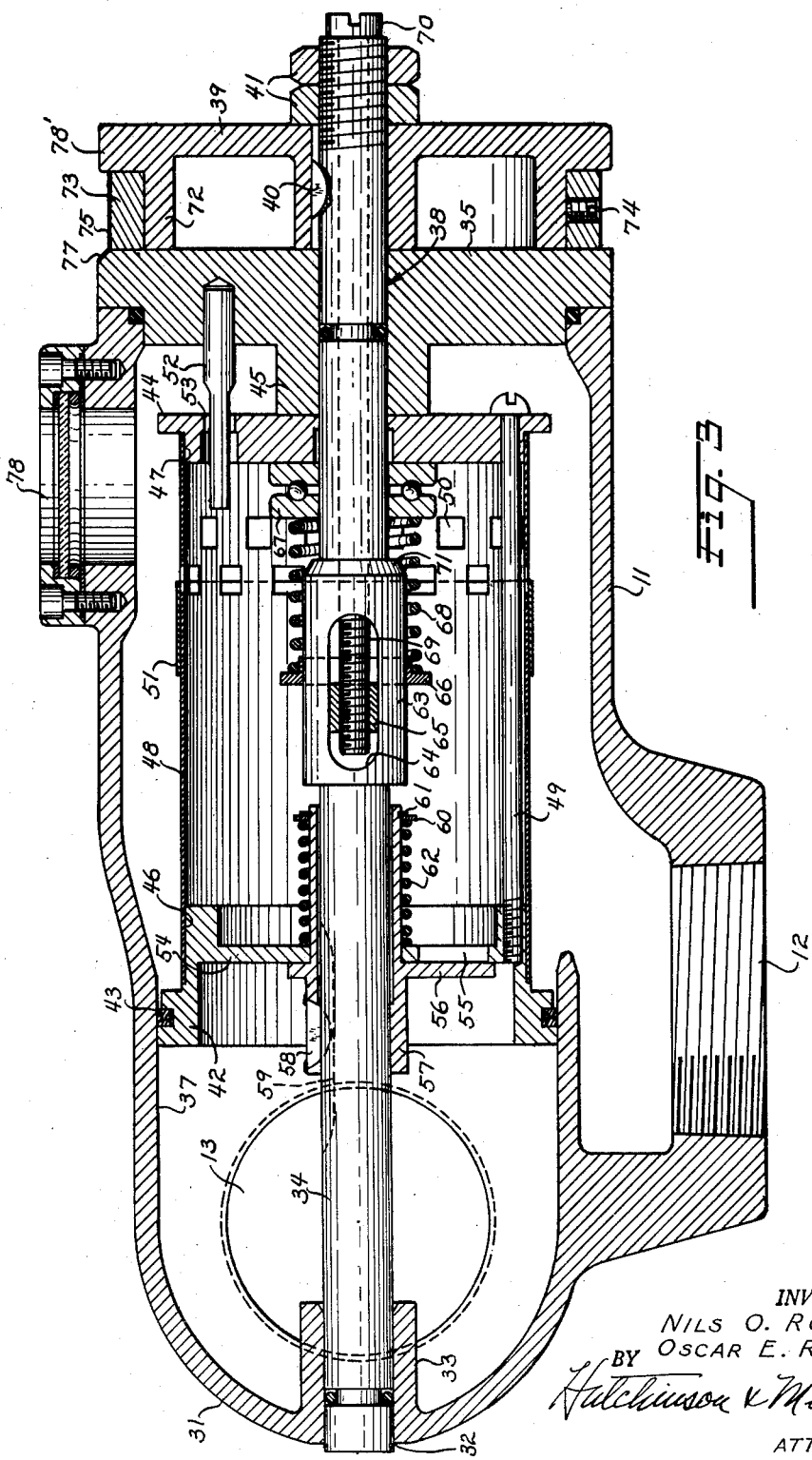

Nils O. Rosaen, Detroit, and Oscar E. Rosaen, Grosse Pointe, Mich., assignors to The Rosaen Filter Company, Hazel Park, Mich., a corporation of Michigan
Filed June 1, 1960, Ser. No. 33,297
15 Claims. (Cl. 73—198)

The present invention relates to improved means for checking the efficiency of component parts of hydraulic systems employing pumps, filters and delivery circuits for the fluid of the system to points of use. The efficiency checking means is, in effect, a flow meter which will accurately and quickly indicate the rate of flow through the system at any selected point and embodies an improvement over the flow meter forming the subject matter of the copending application of Nils O. Rosaen, Serial No. 782,309, filed December 22, 1958.

Among the objects of the invention is to provide a simple, accurately reading and easily usable metering means for insertion into a hydraulic system without dismantling or disconnnecting any parts of hte system or without removing any conduits and involving no more time and effort in installation than that required to change a filter element in the system.

Another object is to provide an improved means for checking the efficiency of the pumps and other component parts of hydraulic systems, and one which utilizes the same housings as that employed for the filtering units of the systems, and which improved means is interchangeable with the filter elements of the filter housings.

Another and important object of the invention is to provide a rate of flow meter readable directly in gallons per minute or other units, irrespective of any change in viscosity of the fluid of the system due to temperature variations of the fluid, within reasonable limits.

A further object of the system is to provide a flow meter which may be interchanged with the filter element of either suction or pressure types of filters used in the system.

An additional object is to provide means for preventing damage to the parts of the system and to the meter means by employing relief valve means for protecting the system against overload in case the orifice of the meter is completely closed.

Another object of the invention is to provide a flow meter that can be adjusted and pre-set at the factory so that accuracy may be maintained in use of the meter with little skill required to take a proper reading.

Other objects and advantages will be apparent to those skilled in the art upon reference to the following description and the accompanying drawings, in which:

FIGURE 1 is a longitudinal side elevational view of one form of filter housing with the flow meter in place and disclosing the indicating arm and legend plate with parts indicated in dotted lines to facilitate an understanding of the invention.

FIGURE 2 is a longitudinal sectional view of the filter housing of FIG. 1, showing a filter element in position, which element is replaceable by the flow meter unit or cartridge of the present invention.

FIGURE 3 is a corresponding longitudinal sectional view of the filter housing but showing the flow meter unit or cartridge inserted in place of the filter element.

As in the prior application, Serial No. 782,309, the subject of this invention embodies a flow meter consisting of two basic parts, a meter cartridge, which is in effect a sliding piston mechanism, and a housing therefor, the housing being in this instance a housing which is normally used for and forms part of an oil filter of the slidable cartridge type, and particularly, such oil filters as are manufactured by the The Rosaen Company of Hazel Park, Michigan, and sold under the trademark "Tell-Tale."

Referring to FIG. 2, oil filters of this type employ a cylindrical filter cartridge, generally indicated by the reference numeral 10, which is mounted within the housing 11 in such a manner as to be axially movable or slidable therein responsive to changes in differential pressure of the fluid between the inlet 12 and outlet 13 of the housing when the system is in operation. Such a filter cartridge comprises a cylindrical filter screening means 24 of any desired type with end caps 25 and 21 arranged as shown, the elements of the cartridge being secured together by means of through bolts 26 so that the cartridge and end caps are movable as a single assembly unit. If the unit is a suction type of filter, the outlet 13 of the filter is generally connected to the intake of the pump in the system and the inlet of the filter is connected to the oil reservoir.

Normally such filter cartridges are spring biased by means such as the coil spring 14 to keep a by-pass valve closed so that the entire flow of fluid normally passes through the cylindrical walls of the filter cartridge to be cleaned thereby. However, as the filter element gradually becomes dirty by collection of deposits strained from the fluid with the interstices becoming gradually clogged, such clogging will result in the differential pressure between the inlet and outlet of the unit gradually increasing until the spring bias is overcome and the filter cartridge then begins to move axially in the housing to the left as viewed in FIG. 2 responsive to such pressure difference, thus compressing the spring. The axial movement of the cartridge is analogous to a piston having different pressures on opposite sides thereof. When the filter cartridge has moved an appreciable distance, a by-pass valve opening is uncovered to permit the incoming oil to by-pass the filter element and pass directly through to the outlet, thus protecting the hydraulic system from damage. In the presently shown form of filter, the by-pass valve means comprises the boss 27 carried by the closure plate 28, the boss being provided with spaced tongue-like members 29 between which the fluid outside of the filter unit may pass directly to the interior of the filter element when the cartridge has moved sufficiently to allow end cap 21 to uncover said spaces between the tongues 29 and thus expose the same to the incoming oil. The oil will under such conditions pass directly to the interior of the filter cartridge and hence out through the orifice 30 in piston-like cap 25 to the outlet 13 of the housing.

Indicating means is also provided exteriorly of the casing for indicating the position of the axially movable filter cartridge in the housing and hence the condition of said filter prior to the actual opening of the by-pass valve. The indicating means is actuated by means responsive to the movement of the cartridge. In the embodiment shown in the drawings, the indicating means, as seen in FIG. 1, comprises an indicating hand or arm 15 carried by a hub 16 which is mounted or fixed by a set screw 17 to a short shaft 18 extending through the wall of the housing and carrying at its inner end a crank arm 19, the upper end of which is positioned to bear against the edge 20 of the cap 21 of the filter element or cartridge. The arm or hand 15 upon rotary movement about the shaft 18 will traverse a legend plate 22 carried on the side of the housing and preferably mounted on a plate-like boss 23. The legend plate preferably carries such indicia as "Filter Is Clean," "Needs Cleaning" and "By-Passing." The angular relationship of arm 15 to crank arm 19 is set substantially at right angles so that when the end of crank arm 19 is bearing against the edge 20 of the filter cartridge cap 21 with the filter cartridge in the position shown in FIG. 2, the indicating hand or arm will point to the "Filter Is Clean" position.

As the filter cartridge 10 moves to the left as viewed in FIG. 2 upon gradual clogging of the element, as explained above, the flange 20 of the end cap of the cartridge will move the crank arm about the shaft 18 which will in turn move the hand 15 downwardly over the legend plate, thus indicating the condition of the filter so that an attendant will be prewarned and be in a position to change or clean the filter element prior to actual by-passing of the fluid.

The present invention relates to a flow meter cartridge which may be substituted for the forementioned oil filter cartridge in the same filter housing whenever it is desired to quickly check the rate of flow in the hydraulic system. In other words, the unit is interchangeable with the filter cartridge and uses the same housing and associated parts.

With the flow meter of the prior application Serial No. 782,309 several striking disadvantages have been experienced use of the meter. The foremost of these concerned the lack of compensation for differences in viscosity of the fluid flowing through the meter due to variations in temperature of the fluid. It has been found in practice that minor variations in the readings obtained of from three to four gallons per minute might be experienced depending upon whether the flowing fluid was hot or cold. Additionally, extreme care had to be used with the prior construction in the manipulation of the orifice valve in the meter to bring the meter to a position where the indicator hand was kept steady at a fixed point on the indicator plate. These disadvantages are overcome by the present flow meter construction, as will be hereinafter pointed out.

In FIG. 3 of the drawings is disclosed the filter housing 11 with the filter cartridge 10, its associated spring 14, the closure plate 28 and the shaft 30 completely removed therefrom and with the substitution thereof the improved flow meter forming the subject matter of the present invention. The housing is of general cylindrical configuration provided with a fluid inlet 12 and a laterally disposed fluid outlet 13. One end of the housing of the type of filter here illustrated is closed as shown at 31 by a rounded integral wall provided with a centrally disposed opening 32 and an integrally formed tubular bearing 33 for receiving and supporting the end of either the shaft 30 of the filter unit shown in FIG. 2 or the shaft 34 of the flow meter unit to be described. Both shafts are provided with grooves near their outer ends for the reception of suitable sealing O-rings preventing leakage of fluid at this point.

The opposite end of the housing, namely the righthand end as viewed in either FIG. 2 or FIG. 3, is adapted to receive either the closure plate 28 of the filter unit or the closure plate 35 of the meter cartridge, both of which are removably secured to the end of the housing by suitable bolts such as shown at 36 in FIG. 2. Near the righthand end of both shafts 30 and 34 are circumferential grooves for the reception of O-rings to prevent leakage along the shafts through the closure plates.

The filter housing has its interior wall at the lefthand outlet end formed into a cylinder 37 for the reception of the piston-like end cap 25 of the filter cartridge.

The flow meter cartridge of the present device comprises a plurality of elements all of which are carried or mounted upon the shaft 34 which shaft is substantially longer than the overall length of the housing. The lefthand end of the shaft is slidingly fitted in the tubular bearing 33 while the opposite end of the shaft passes through a centrally disposed opening 38 in the closure plate 35 to receive the cylindrical hand wheel 39, which is keyed at 40 to the shaft for rotation thereof. The outer righthand end of the shaft is threaded to receive the nuts 41 for adjusting the longitudinal position of the shaft within the housing and for locking the same when so adjusted.

The movable cartridge portion comprises at the lefthand end a piston-like member 42, provided with a suitable piston ring 43 which is slidably fitted as shown in FIG. 3 within the cylinder 37. Also slidably carried by the shaft 34 is a disc 44 shown bearing against a spaced abutment 45 of the closure plate 35. Both the pistonlike member 42 and the disc 44 have reduced peripheral surfaces 46 and 47, respectively, on the sides of the members facing each other for the reception and support of a shell 48, the piston, disc and shell being secured together for movement as a unit by through bolts 49 passing through the disc 44 and threaded into openings in the piston 42, as shown in FIG. 3.

The shell 48 is imperforate except for the end nearer the disc 44 where a series of perforations 50 are formed either in the configuration as shown or otherwise. It will be understood that flow of oil through the meter will pass through these perforations 50 when the device is being used. The shell 48 also has a band 51 encircling its exterior circumference, which band is of appreciable width and is formed to tightly fit the shell but may be forcefully slid over the perforations 50 to vary the number and/or effective size of said perforations open to the passage of the oil for a purpose to be hereinafter described.

The cylindrical assembly of piston 42, shell 48 and disc 44 is prevented from being rotated when the hand wheel 39 is manually turned, by means of a pin 52 carried by the closure plate 35 extending through an opening 53 formed in the disc 44.

Piston 42 has its wall 54 provided with an arcuate opening 55 extending half way around the same to provide an orifice for permitting flow of fluid from within the shell to the outlet 13. This arcuate orifice can be fully closed or fully opened by rotation of a semicircular valve plate 56 carried by tubular bushing 57 keyed at 58 for rotary movement on rotation of shaft 34 by means of hand wheel 39. Additionally keyway 59 in shaft 34 is of substantial length as shown in FIG. 3 so as to permit axial sliding movement of bushing 57 away from the piston wall and consequently valve member 56 away from the arcuate valve opening 55 under certain differential pressure conditions. Additionally keyway 59 is formed somewhat wider in width than the thickness of key 58 so as not to permit the elements to bind and prevent the proper action of the parts when occasion arises.

Bushing 57 extends through a central opening formed in piston wall 54, as shown, into the interior of the shell and has a coil spring 62 surrounding the extended portion with one end of the spring seating against the piston wall and the other end bearing against a washer 60 held in position by a snap ring 61 fitting in a peripheral groove in the bushing. The spring is placed under compression adequate enough to keep the valve member and the bushing against the piston wall, under most conditions of use, but permitting the valve and bushing to move axially away from the piston wall 54 in the event the valve should be fully closed by the operator which would necessarily result in excessive differential pressures to exist across the valve and wall and which might cause harm to the unit and parts of the system.

Substantially midway of the length of shaft 34, the same is enlarged in diameter as at 63 to form a cylinder of appreciable size as seen in FIG. 3. This enlarged portion is slotted as at 64 to receive a cross bar 65 which extends completely through the slot projecting a short distance either side of said enlarged portion 63. The projecting ends of the bar 65 are adapted to bear against a washer 66 slidingly carried by the enlarged portion of the shaft.

Also slidably mounted on the shaft 34 is a thrust bearing generally indicated as 67 embodying two plates with a ball bearing race therebetween. The thrust bearing is disposed adjacent the inner face of disc 44 and a coil spring 68 of selected strength is interposed between the washer 66 and the bearing 67.

Shaft 34 is axially bored from the slot 64 to the outer righthand end of the shaft for the reception of an adjusting screw 69 threaded into a threaded opening in cross bar 65 so that rotation of the screw from the exposed head 70 will move bar 65 and hence washer 66 to thus vary the compression of spring 68. From viewing the relationship of parts as described and shown in FIG. 3, spring 68 will maintain the flow meter cartridge, comprising the piston 42, shell 48 and disc 44, towards the right, as viewed, with the disc 44 held against the spacing member 45 of the closure plate. It is here to be noted that spacing member 45 is designed to properly position disc 44 with relation to the outer end of crank arm 19 of the indicating mechanism in the same relative position as the edge 20 of flange 21 assumed when the filter cartridge is employed, so that the indicating means will function properly when the flow meter is inserted into the filter housing.

The righthand edge 71 of enlarged shaft part 63 acts as a stop means limiting the movement of the flow meter cartridge to the left, the thrust bearing 67 abutting the shoulder 71. The adjustment of the position of shoulder 71 and hence the limit of movement of the cartridge is made through the adjusting nuts 41 as heretofore mentioned.

Hand wheel 39 is provided with a reduced portion 72 upon which is mounted a ring 73 rotatably adjustable with respect to the hand wheel and adapted to be fixed with reference thereto by set screw 74. Referring to FIG. 1, as well as FIG. 3, the ring 73 will carry the graduated dial readings, in the instance shown this being a separate thin band 75 suitably calibrated in units, such as gallons per minute, which band is secured to the ring 73 by means of screws 76. Since the orifice 55 is arcuate and the valve member 56 is semicircular as recited, a half rotation of the hand wheel will move the valve from fully closed to fully open position and hence the graduated band 75 need not extend completely around the ring 73.

A reference mark or notch 77 is placed at the upper outer edge of the closure plate 35 as indicated and the scale or graduated band 75 is adjusted with reference thereto. The surface 78' of the hand wheel may be knurled to facilitate turning of the wheel.

A sight glass 78 is generally provided in the filter housings of the type heretofore described to give a secondary indication of the condition of the filter by permitting observation of the position of the flange 21 of the filter cartridge with respect to a reference point associated with the glass.

As heretofore indicated the present flow meter structure is a decided improvement over the meter of the prior application in many material respects. While the unit is shown in the drawings as adaptable to a filter of a certain type, it is equally adaptable to other forms of filters of the "Tell Tale" type manufactured by The Rosaen Company. For example, it could be readily adaptable for use with a filter having an outlet at the lefthand end of the housing, such as the housing shown in the prior application, in which instance the left end of shaft 34 would be terminated short of the outlet in a manner similar to the shaft of the prior case. It will thus be understood that each flow meter unit is designed for use in a particular style of housing and for use with a filter housing of a particular capacity. The structure of the important elements is however the same in each instance.

However, as shown in present FIG. 3, this flow meter would be equally effective whether the housing was of the suction type (outlet 13 connected to the intake of the pump of the hydraulic system) or of the pressure type (inlet 12 leading from the output side of the pump of the system). If, for example, we consider the housing to be of the pressure type, it will be noted that with the shaft 34 arranged as shown in FIG. 3 with both ends thereof extending through the casing and properly sealed with O-rings, as explained heretofore, the shaft will be balanced by atmospheric pressure at either end and not subject to the internal higher pressures of a pressure type housing. The structure of the meter of Serial No. 782,309 could not be so used.

Additionally the relief valve means for the orifice 55 is a decided advantage in preventing damage to the unit and associated parts by virtue of its ability to move axially away from the orifice upon development of excessive differential pressure thereacross whenever such excessive pressure should occur in the event the operator completely closes the orifice 55.

By means of the present construction the flow meter can be accurately adjusted at the factory and delivered to the purchaser so as to simplify the purchaser's effective use of the meter unit in the filter housings of his particular hydraulic installation. Once installed in the filter housing the operator needs only to turn hand wheel 39 until the indicating arm 15 moves to and is held steady on a mark 79 on the legend plate, that point being arbitrarily selected, as hereinafter pointed out, and indicated by an "O" mark to which an arrow may be directed, as shown in FIG. 1. If the meter elements have been properly adjusted at the factory, the operator can take a direct flow reading from the calibrated scale 75 in gallons per minute when the indicator hand is held on this mark 79. This reading will give an accurate indication of the rate of flow of fluid through the housing, irrespective of the viscosity of the fluid due to temperature variations therein.

The various elements constituting the parts of the flow meter unit are assembled on the shaft 34, as shown in FIG. 3, and as heretofore described, so that the entire unit is compactly and securely held together thereon by the springs 62 and 68 bearing against their associated parts and the adjusting nuts 41 and screw 69.

The scale 75 is calibrated to read in the desired flow rates (gallons per minute, etc.). The scale must be calibrated in accord with a selected and known pressure drop across the orifice. This is determined by the use of a selected spring 68 adjusted to give the desired pressure differential between inlet and outlet pressures for a particular situation and measuring at the factory with standard meters the flow being passed through the housing. To accomplish this an arbitrary point, indicated at 79 in FIG. 1 by the dot or "O" symbol, is selected between the "Filter is clean" position and the "By-passing" position on the legend plate and the calibrations for the scale are made by passing known flows of oil through the housing with the orifice adjusted to various sized openings to bring the flow meter cartridge at a point where the indicator arm 15 is held steady on the selected point 79 of the legend plate.

The hand wheel 39 prior to insertion of the unit in the housing is rotated to fully close the orifice 55 in the piston 42 by the valve element 56 and the zero reading on the scale 75 is set opposite the indicator mark 77 on the closure plate by rotating the ring 73 to the proper position and fixing the ring relative to the wheel 39 by means of the set screw 74.

The indicator arm 15 and the crank arm 19, as previously mentioned, are set at substantially right angles to each other, which setting is preferably made at the factory to agree to a specified standard for the particular filter in question, but further needed adjustment can be made by the set screw 17 by the operator of the meter.

The flow meter unit, as a whole, is then inserted into a specified type of filter housing, as illustrated in the drawings at 11, the filter cartridge having been previously removed. The left hand end of the shaft 34 is snugly fitted into the open tubular bearing or socket 33 of the casing with piston 42 being slidably positioned within the cylinder 37 and closure plate 35 securely bolted to the righthand end of the housing. The meter is then ready for final adjustment, this preferably being done at the factory.

The indicating arm 15 is then manually pushed upwardly or rotated clockwise to bring the end of crank arm 19 to bear against the left side of disc 44, as shown in dotted lines in FIG. 1. The orifice valve 55—56 is opened and the hydraulic system is put into operation so that flow of fluid entering inlet 12 passes into the housing around the meter cartridge, enters through openings 50 in the shell to the interior of the cartridge and hence out through orifice 55 to the outlet 13 of the housing. Adjusting nuts 41 are loosened and the position of shaft 34 in the housing with reference to the flow meter cartridge (elements 42—43—44) is adjusted so as to position stop shoulder 71 at a specified point where it will limit movement of the cartridge to the left, namely, where the indicating arm or hand 15 is still on the legend plate and preferably at the point 80 as shown in FIG. 1 at the bottom of the plate. It will be understood that with flow passing through the housing rotary movement of valve plate 56 towards closing position of the orifice 55 wll increase the differential pressure or pressure drop across the orifice and movement of the cartridge to the left, as viewed in FIG. 3, is opposed by spring 68 which tends to hold or rather force the cartridge to the right and maintain disc 44 against the spacing member 45 of the closure plate. As the size of orifice 55 is reduced by movement of the valve member by the hand wheel a point will be reached where the pressure drop across the orifice, or on opposite sides of piston member 42, becomes great enough to overcome the force of coil spring 68 with the result that the cartridge will then be moved to the left in the direction of flow by the differences in pressure. The extent of this movement of the cartridge is however limited in the present device by contact of the thrust bearing 67 with the limiting shoulder 71. As heretofore stated shoulder 71 is adjusted to a position where movement of the cartridge to the left is just sufficient to bring the indicating hand 15 to the lower line of the legend plate indicated at 80 by the dotted line view of the hand in FIG. 1. When this limit position is achieved the nuts 41 are tightened on the shaft to maintain this stop position secure.

Having selected point 79 on the plate 22 we next proceed with the adjustment of the unit to compensate for variations in viscosity of the oil due to temperature differences. At the factory a standard flow meter is connected to the inlet 12 of the housing and a known flow of hot oil is passed therethrough—such as a flow of 25 gallons per minute. The calibrated dial 75 is turned by the hand wheel and set to the 25 gallons per minute mark opposite the indicator point 77 and adjusting screw 70 is then turned to move cross bar 65, which bears against washer 66 and thereby adjusts the force of coil spring 68, until movement of the cartridge brings hand 15 to the mark 79 on the legend plate. Without changing the hand knob, a similar known flow of cool oil is next passed through the housing and the position of the hand noted with reference to the mark 79, the hand wheel and scale still being set at 25. Due to the change in viscosity of the oil between the temperature of hot oil and cool oil, there will undoubtedly be a variance in actual rate of flow which will be indicated by the hand 15 not being returned to point 79 on the legend plate. The difference may only be a variance of from 3 to 4 gallons per minute between cold and hot oil readings. To cmpensate for this variance and to adjust for difference in viscosity of the fluid the snugly fitting band 51 is provided which is forcefully moved on the shell 48 with respect to the openings or perforations 50 through which the oil flows to the interior of the shell to change the number or size of such openings.

After noting the variance of the hand 15 with respect to the mark 79 with the same flow (25 gallons per minute) of cool oil passing through the unit, the unit is removed from the housing and the position of the band 51 manually moved with respect to the openings 50 and the unit returned to the housing and again checked with the same flow of hot and then cool oil. This procedure is repeated until the band is finally adjusted to a position which will bring the hand 15 to the mark 79 on passing either hot or cool oil of the same flow through the meter and housing. When such adjustment is completed the position of the band 51 can be securely held in place by soldering or welding the band with respect to the shell. The meter is now compensated for varying viscosities in the fluid due to temperature changes thereof which might naturally occur in the operation of an industrial hydraulic installation where the meter is to be used.

The flow meter unit has now been completely factory adjusted for efficient operation in filter housings of the specified type and is ready for delivery to the intended user for use in his hydraulic system to check the efficiency of parts thereof, such as the operation of the pump, etc.

The system operator having filters installed in his system will be able to use this meter in any of his filter housings with which this flow meter unit has been designed. The operator will remove the filter unit, as heretofore described, and insert the flow meter unit therein so as to check the flow at that particular point in his system. After the unit is inserted and secured in place he should turn the control or hand wheel 39 to fully open the orifice 55 (this would be the position of the wheel where the scale 75 would indicate the maximum number of gallons per minute). The system would then be turned on and allowed to run until the fluid being passed through the housing appears free of air entrainment, this being noted by observation through the sight glass 78. The first time the meter until is placed in any housing of the system, the operator should check the hand 15 for position accuracy, and if necessary adjust the same by means of the set screw 17. This check is easily made by turning the control or hand wheel 39 to the zero setting which will close the orifice 55, which will result in the meter cartridge, comprising piston 42, shell 43, and disc 44 together with associated parts, moving to the left of FIG. 3 and against the limiting shoulder 71 on the shaft 34. With the cartridge moved to this position the hand 15 should be pointing to the lower edge of the legend plate as indicated at 80 in FIG. 1. If the hand is not positioned as indicated with the zero reading on the scale 75, then the operator should loosen the set screw 17 and properly set the hand to the correct position, indicated as 80.

Having made the minor adjustment of the hand at zero reading of the scale, the operator can now take his accurate rate of flow reading. With the valve fully open to remove all entrainment of air, the operator merely has to turn the hand wheel 39 slowly clockwise toward the valve closing position (the zero position of the scale) until the indicator hand 15 is moved to the "O" mark 79. When the hand is held on this mark, the amount of flow through the housing in gallons per minute may be read directly from the graduated band or scale 75 on the hand wheel 39.

It will therefore be seen that a very simple, relatively inexpensive, and effective means has been devised for quickly checking and determining the rates of flow of a fluid through various parts of a hydraulic system wherever a filter housing of the specified type has been installed in the system, the unit being easily and quickly installed and the reading taken by merely turning the hand wheel 39 to bring the indicator hand 15 to the "O" mark 79 on the legend plate and the scale 75 being read at the reference point 77, directly in rate of flow units.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an un-

We claim:

1. A rate of flow meter adapted for use in a filter housing of the axially movable filter cartridge type provided with an interiorly formed cylinder at the outlet end of said housing the opposite end being open for the reception of the filter cartridge, said housing having means for indicating movement of said cartridge in said housing, said flow meter being insertable within said housing in place of the filter cartridge and comprising a closure plate for the open end of said housing, a shaft extending through said closure plate and axially of said housing and provided with means positioned outside of said plate for manually rotating said shaft and means calibrated for indicating the rate of flow therethrough, a meter cartridge mounted for axial movement upon said shaft and including a piston at one end for slidable reception in said cylinder of the housing and a shell carried by said piston, spring biasing means for urging the meter cartridge against the closure plate, said piston being provided with an orifice, a valve for said orifice adapted to be actuated by said shaft on manual rotation thereof said shell being provided with suitable openings therethrough to permit fluid entering said housing to pass to the interior of said meter cartridge for flow through said orifice in said piston to the outlet of said housing and means actuated from outside of said housing for adjusting the force of said spring biasing means to select a desired pressure drop across said piston.

2. The subject matter of claim 1 wherein adjustable means is associated with said slidable piston and shell to compensate for changes in viscosity of the fluid being metered due to variations in temperature thereof.

3. The subject matter of claim 1 wherein said valve for said opening in said piston is formed to move away from said opening in an axial direction of said housing towards the outlet thereof and against a biasing means to thus relieve the development of excessive differential pressures across the piston and prevent damage to the parts in the event the valve should be moved to closed position.

4. The subject matter of claim 1 wherein an adjustable stop means is employed for limiting the axial movement of said piston and shell towards said outlet in response to an increase in differential pressure across said piston overcoming the force of said spring biasing means.

5. A rate of flow meter adapted for use in a filter housing of the axially movable filter cartridge type provided with an interiorly formed cylinder at the outlet end of said housing the opposite end being open for the reception of the filter cartridge, said housing having means for indicating movement of said cartridge in said housing, said flow meter being insertable within said housing in place of the filter cartridge and comprising a closure plate for the open end of said housing, a shaft extending through said closure plate and axially of said housing and provided with means positioned outside of said plate for manually rotating said shaft and means calibrated for indicating the rate of flow therethrough, a meter cartridge mounted for axial movement upon said shaft and including a piston at one end for slidable reception in said cylinder of the housing and a shell carried by said piston, spring biasing means for urging the meter cartridge against the closure plate, said piston being provided with an orifice, a valve for said orifice adapted to be actuated by said shaft on manual rotation thereof, said shell being provided with suitable openings therethrough to permit fluid entering said housing to pass to the interior of said meter cartridge for flow through said orifice in said piston to the outlet of said housing and adjustable means carried by said shell for varying the effective openings therethrough to compensate for changes in viscosity of the fluid being metered due to variations in temperature thereof.

6. A rate of flow meter adapted for use in a filter housing of the axially movable filter cartridge type provided with an interiorly formed cylinder at the outlet end of said housing the opposite end being open for the reception of the filter cartridge, said housing having means for indicating movement of said cartridge in said housing, said flow meter being insertable within said housing in place of the filter cartridge and comprising a closure plate for the open end of said housing, a shaft extending through said closure plate and axially of said housing and provided with means positioned outside of said plate for manually rotating said shaft and means calibrated for indicating the rate of flow therethrough, a meter cartridge mounted for axial movement upon said shaft and including a piston at one end for slidable reception in said cylinder of the housing, a cylindrical shell carried by said piston at one end and by a disc at the other end, spring bias means for maintaining the meter cartridge against the closure plate with the disc bearing thereagainst, said piston being provided with an orifice, a valve for said orifice rotatably carried by said shaft, adjustable stop means carried by said shaft for limiting axial movement of said flow meter cartridge away from said closure plate in response to an increase in differential pressures across said piston, said shell being provided with a series of openings therethrough to permit fluid entering the housing to pass to the interior of said meter cartridge, adjustable means carried by said shell for varying the effective size and number of said openings available to the fluid flow so as to compensate the meter for changes in viscosity of the fluid due to temperature variations, and means for positioning the meter cartridge within the housing so that the movement of said cartridge will be transmitted to the same means for indicating movement of the filter cartridge so as to indicate the position thereof.

7. A rate of flow meter adapted for use in a filter housing of the axially movable filter cartridge type provided with an inlet and an outlet and an interiorly formed cylinder at the outlet end of said housing the opposite end being open for the reception of the filter cartridge, said housing having means for indicating movement of said cartridge in said housing including an exteriorly positioned legend plate and an indicaing arm associated therewith and actuable by axial movement of the filter cartridge, said flow meter being insertable within said housing in place of the filter cartridge and comprising a closure plate for the open end of said housing, a shaft extending through said closure plate and axially of said housing and provided with means positioned outside of said plate for manually rotating said shaft and means calibrated for indicating the rate of flow therethrough, a meter cartridge mounted for axial movement upon said shaft including a piston provided with an orifice and positioned at one end for slidable reception in said cylinder of the housing, a cylindrical shell carried by said piston at one end and by a disc at the other end, spring biasing means of selected strength for maintaining the meter cartridge against the closure plate with the disc bearing thereagainst, a valve for said orifice rotatably carried by said shaft, adjustable stop means carried by said shaft for limiting axial movement of said flow meter cartridge away from said closure plate in response to an increase in differential pressure across said piston, said shell being provided with a series of openings therethrough to permit fluid entering the housing to pass to the interior of said meter cartridge, adjustable means carried by said shell for varying the effective size and number of said openings available to the fluid flow so as to compensate the meter for changes in viscosity of the fluid due to temperature variations therein, means for positioning the meter cartridge within the housing so that movement of said cartridge will be transmitted to the indicating arm in the same manner as movement of the filter cartridge was transmitted, and an indicating mark placed on said legend plate to indicate the point to which said indicating arm should be moved to hold the cartridge in equilibrium between the bias of said spring biasing means and the pressure drop across the orifice in said piston due to the adjustment of said valve to thereby secure an accurate reading of the rate of flow of fluid passing through said orifice and said meter.

8. A rate of flow meter as specified in claim 7 including means for preventing the rotation of said meter cartridge on said shaft.

9. A rate of flow meter as specified in claim 7 in which said spring biasing means for maintaining the meter cartridge against the closure plate includes adjustable means to vary the strength of said spring and to thereby select the desired pressure drop across said orifice in said piston to effect movement of said cartridge away from said closure plate.

10. A rate of flow meter as specified in claim 7 in which said valve for said orifice is fixed to said shaft for rotary movement therewith but slidable axially of said shaft away from said orifice towards said outlet responsive to excessive differential pressure across said orifice and said piston.

11. A rate of flow meter as specified in claim 7 in which said adjustable stop means for limiting axial movement of said flow meter cartridge includes means for adjusting the same from outside of said closure plate.

12. A rate of flow meter as specified in claim 7 wherein said adjustable means carried by said shell for varying the effective size and number of openings in said shell comprises a snugly fitting band encircling said shell and forcefully slidable thereon with reference to said openings.

13. A rate of flow meter as specified in claim 7 in which said shaft extends axially through both ends of said housing so as to be subject to atmospheric pressure on both ends to be balanced thereby and hence not effected by the pressures developed internally of the housing when the flow meter is in use.

14. The method of adjusting for use the rate of flow meter described in claim 7 which involves the steps of calibrating said means for indicating rate of flow with said spring biasing means adjusted to a desired strength and with said indicating means held on said mark on said legend plate, adjusting the position of said stop means to limit axial movement of the cartridge away from the closure plate to a point where the indicating arm on said legend plate has moved to the bottom of said plate, then passing known flows of first hot and then cold fluids through the meter and adjusting the means carried by the shell for varying the effective size and number of the openings therein so as to bring the indicating arm to the same mark on the legend plate irrespective of the viscosity of the oil so as to compensate for temperature differences.

15. The method of correcting the rate of flow meter described in claim 7 for variations in viscosity of the fluid due to differences in temperature thereof, which comprises balancing the force of flow of the fluid tending to urge the meter cartridge towards the closure plate by varying the effective size and number of the openings in the shell of said cartridge available to the fluid flow to thus vary the pressure of the fluid around and outside of said shell to create a balancing force thereby on the cartridge in the opposite direction, and making repeated adjustments after checking the meter with known flows of first hot and then cold fluid until responsive movement of the cartridge under metering conditions is the same for either passing hot or cold fluids.

References Cited in the file of this patent

UNITED STATES PATENTS

| 1,456,621 | Chadwick | May 29, 1923 |
| 2,069,309 | Henszey | Feb. 2, 1937 |